F. BERENDES.
DISK PLOW.
APPLICATION FILED OCT. 1, 1915.
1,168,594.
Patented Jan. 18, 1916.
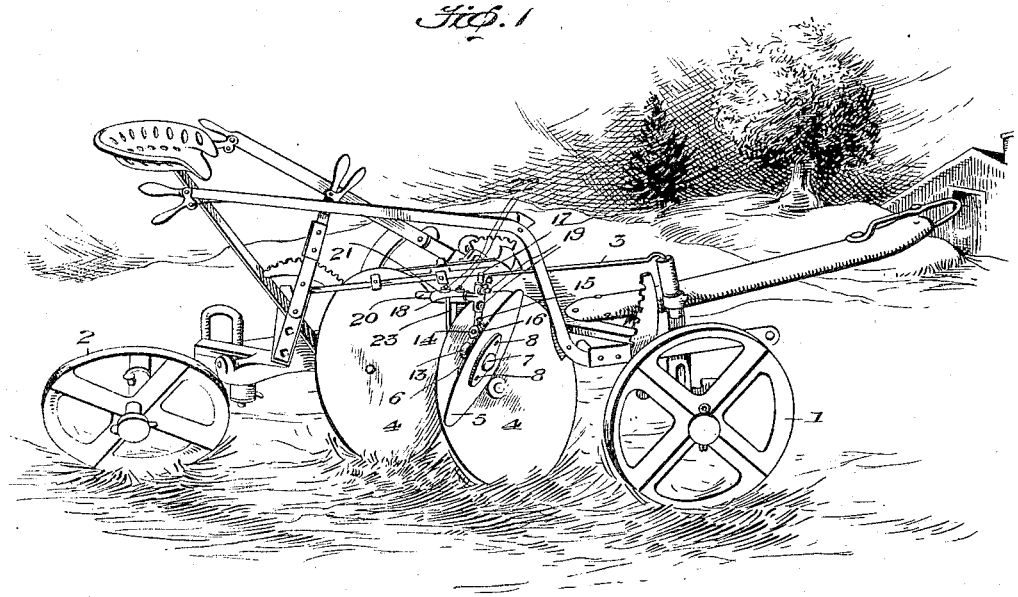
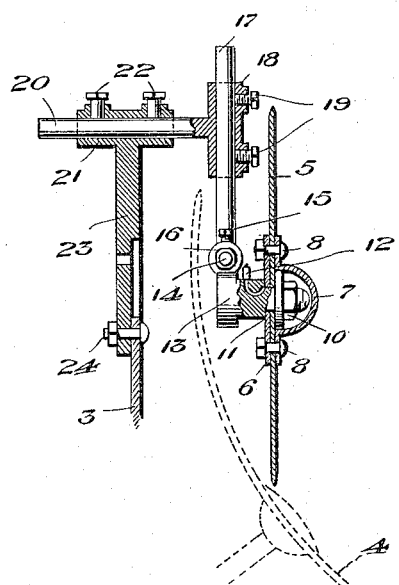

UNITED STATES PATENT OFFICE.

FREDERICK BERENDES, OF EVANSVILLE, INDIANA.

DISK PLOW.

1,168,594. Specification of Letters Patent. Patented Jan. 18, 1916.

Application filed October 1, 1915. Serial No. 53,490.

*To all whom it may concern:*

Be it known that I, FREDERICK BERENDES, a citizen of the United States, residing at Evansville, R. F. D., No. 7, county of Vanderburgh, and State of Indiana, have invented certain new and useful Improvements in Disk Plows, of which the following is a specification.

This invention relates to disk plows.

My object is to provide an improved, adjustable, supplemental disk or revolving scraper, adapted for coöperation with a plow or cultivator disk and for various adjustments in relation thereto which will serve to level up the land by turning the ground as would be done by a mold-board; cover the weeds, stubble or anything that might be on the ground; and which will lessen the draft because it will take away the ground from the cutting disk.

My improvements relate both to the supplemental disk and its improved mounting and to the coöperation of the disk with the plow or cultivator disk. The adjustable mounting enables the supplemental disk to be set in any desired position to suit the condition of the soil; it is flat on both sides and therein constitutes an improvement over ordinary concave or convex scraper disks because in wet or sodden ground a concave or convex supplemental disk turns the ground too far, thereby turning the trash and grass upon the plowed surface instead of covering it up, whereas my improved flat disk covers up the trash or grass and in loose or loamy soils my disk or scraper will operate more satisfactorily than concave or convex scrapers because it has a much wider range of adjustment and obviates the necessity of the ordinary scrapers intervening between the disk scraper and the cutting disk so that the ground is taken away from the cutting disk without the aid of ordinary scrapers and the draft on the plow is lessened because my supplemental disk assists in turning the ground and there is no usual scraper to clog. The earth thrown up by the cultivator disk coming in contact with my improved supplemental revolving disk, causes the latter to revolve as it is pulled over the ground.

With my improvements, meadow land can be plowed with a disk plow and as my supplemental disk is revoluble, there is no opportunity for weeds, stubble, or anything else to clog the opening between the edge of the old form of scraper and the disk.

My disk is constructed and mounted so that all desirable or necessary adjustment in relation to the cultivator disk may be obtained according to conditions of use and results desired. In practice, my disk is usually of from ten to eighteen inches or more in diameter and arranged to coöperate with the upper portion of the cultivator disk and at an angle thereto, my improvements being carried by the frame of the plow or cultivator.

I am aware that my invention is susceptible of modification within the spirit and scope thereof and the foregoing recital of constructions, functions, size and differences, is to be considered as illustrative, rather than restrictive, of the scope of the invention.

In the accompanying drawings:—Figure 1 is a perspective of a disk plow provided with my improvements; and Fig. 2, a detail vertical section with certain parts in full lines, the cultivator disk being shown in dotted lines.

My invention is shown applied to an ordinary and well-known type of disk plow having main wheels 1, trailer wheel 2, frame 3 and cultivator disks 4. The construction and operation of the parts being well-known, description is unnecessary.

My improvements embody a supplemental disk 5 and the adjustable mountings by which it is connected to the frame 3 of the plow or cultivator so that it is adapted to be disposed in any desired relationship to the disk 4. In practice, the supplemental disk 5 is of from ten to eighteen or more inches in diameter and is of flat form as distinguished from those concave and convex supplemental scraper disks which have heretofore been employed. Being of flat form on both sides, it is adapted to cover up or turn under the trash, grass, stubble, etc., instead of turning the same upon the plowed surface. With loose or loamy soil, this flat disk is adapted to work better than a convex or concave disk because it has a very much wider range of adjustment in relation to the cultivator disk 4 and obviates the necessity of using ordinary scrapers. As ordinary scrapers are done away with and as my disk helps to turn the ground, the draft on the plow is greatly lessened. In effect, the action of my supplemental disk is that of a mold-board plow whose angle can be changed at will. Being revolubly mounted, the disk 5 cannot be clogged by weeds, stubble or other things getting in the opening between it and the disk 4.

On the inner side of the disk 5 is a plate 6 and on the outer side a cup 7 whose plate portion is connected to the plate 6 by bolts 8. A spindle 9 on which the disk 5 is revolubly mounted has its end projecting into the cup 7. Means, such as a nut 10, on the spindle 9 may be employed to retain the disk on its spindle. The cup 7 prevents the entry of dirt or trash to the spindle and enables the disk 5 to run freely at all times. The plate 6 may bear against a shoulder 11 on the hub of the spindle 9 and any suitable oiling device or lubricator 12 may be employed, whereby the spindle will be properly lubricated and the disk enabled to rotate without substantial friction.

The spindle 9 is integral with a yoke 13 and projects at right angles thereto or may be separate and sunk thereto to exclude dirt. The yoke is rockably or rotatably mounted on the head 14 and may be secured in any position of angular adjustment by set screws 15 and is prevented from coming off said head by a nut 16 having a screw connection with the head 14; the head 14 has an enlarged portion at its opposite end. The head 14 is carried by a stem 17 which is received in a hollow head or sleeve 18 and held in any desired raised or lowered position, or axially turned position, by set screws 19 passing through the head 18 and bearing on the stem 17. The sleeve or head 18 is provided with a stem 20 which is slidably and rotatably received in a sleeve or head 21 and may be held by set screws 22 where adjusted. The head 21 is carried by a shank 23 which in turn is fastened to the frame 3 by any suitable connection, such as bolts, 24.

The foregoing mounting for the disk 5 enables its plane to be disposed at any desired angle to the cultivator disk 4 and at different heights in relation thereto so that any desired conditions may be met.

Having thus described my invention, what I claim as new and desire to secure by Letters Patent, is:—

As an attachment for disk plows or cultivators, a supplemental disk adapted to be disposed in different positions in relation to a plow or cultivator disk, combined with a yoke and spindle, a stem having a head on which said yoke is rockably mounted, means for securing the yoke in different positions in relation to the head, a mounting in which the stem is slidably and rotatably mounted, means for securing the stem in said mounting, a slidable and rockable support for said mounting, and means for connecting said last-named support to the frame of the plow or cultivator.

In testimony whereof, I hereunto affix my signature.

FREDERICK BERENDES.

Copies of this patent may be obtained for five cents each, by addressing the "Commissioner of Patents, Washington, D. C."